US009528842B2

(12) United States Patent
Braeuchle et al.

(10) Patent No.: US 9,528,842 B2
(45) Date of Patent: Dec. 27, 2016

(54) METHOD AND DEVICE FOR ASCERTAINING A SOURCE OF DANGER ON A TRAVEL ROUTE (71) Applicant: Robert Bosch GmbH, Stuttgart (DE)

(72) Inventors: Christian Braeuchle, Hassmersheim-Hochhausen (DE); Michael Knoop, Ludwigsburg (DE); Folko Flehmig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/423,594

(22) PCT Filed: Jul. 18, 2013

(86) PCT No.: PCT/EP2013/065212
§ 371 (c)(1),
(2) Date: Feb. 24, 2015

(87) PCT Pub. No.: WO2014/029569
PCT Pub. Date: Feb. 27, 2014

(65) Prior Publication Data
US 2015/0185036 A1    Jul. 2, 2015

(30) Foreign Application Priority Data
Aug. 24, 2012    (DE) .................. 10 2012 215 064

(51) Int. Cl.
*G01C 21/00* (2006.01)
*G01C 21/36* (2006.01)
(Continued)

(52) U.S. Cl.
CPC .............. *G01C 21/36* (2013.01); *G01C 21/32* (2013.01); *G07C 5/008* (2013.01); *G07C 5/08* (2013.01);
(Continued)

(58) Field of Classification Search
None
See application file for complete search history.

(56) References Cited

U.S. PATENT DOCUMENTS 7,277,809 B1 * 10/2007 DeWitt, Jr. ............. G01P 21/02
                                                        340/901
8,330,620 B2    12/2012 Staehlin et al.
(Continued)

FOREIGN PATENT DOCUMENTS

CN    101033976 A    9/2007
CN    101350137 A    1/2009
(Continued)

OTHER PUBLICATIONS

International Search Report for PCT/EP2013/065212, issued on Nov. 20, 2013.

*Primary Examiner* — Adam Alharbi
(74) *Attorney, Agent, or Firm* — Norton Rose Fulbright US LLP; Gerard Messina (57) ABSTRACT A method is provided for ascertaining a source of danger on a travel route, during the travel of a vehicle along the travel route, a vehicle parameter being measured and compared to a vehicle parameter threshold value; as a function of the comparison, danger data including the measured vehicle parameter and a vehicle location assigned to the measurement being formed for the information that a danger source has been formed at the vehicle location assigned to the measurement. A corresponding device as well as a corresponding computer program are also provided.

28 Claims, 2 Drawing Sheets (51) Int. Cl.
*G08G 1/01* (2006.01)
*G08G 1/0962* (2006.01)
*G08G 1/0967* (2006.01)
*G08G 1/16* (2006.01)
*G07C 5/00* (2006.01)
*G01C 21/32* (2006.01)
*G07C 5/08* (2006.01)

(52) U.S. Cl.
CPC ............ *G08G 1/0112* (2013.01); *G08G 1/0129* (2013.01); *G08G 1/0133* (2013.01); *G08G 1/0137* (2013.01); *G08G 1/0141* (2013.01); *G08G 1/0145* (2013.01); *G08G 1/0962* (2013.01); *G08G 1/0967* (2013.01); *G08G 1/09626* (2013.01); *G08G 1/096716* (2013.01); *G08G 1/096725* (2013.01); *G08G 1/096741* (2013.01); *G08G 1/096775* (2013.01); *G08G 1/16* (2013.01); *G08G 1/164* (2013.01)

(56) References Cited

U.S. PATENT DOCUMENTS

| | | |
|---|---|---|
| 2010/0066562 A1 | 3/2010 | Staehlin et al. |
| 2011/0224893 A1* | 9/2011 | Scofield ............. G01C 21/3492 701/119 |
| 2012/0143493 A1* | 6/2012 | Tang .................. G01C 21/3697 701/423 |
| 2012/0191291 A1 | 7/2012 | Krause et al. |

FOREIGN PATENT DOCUMENTS

| | | |
|---|---|---|
| DE | 102008012661 | 2/2009 |
| DE | 102009018742 | 10/2009 |
| DE | 102010055370 | 6/2012 |
| EP | 2169635 | 3/2010 |

* cited by examiner

METHOD AND DEVICE FOR ASCERTAINING A SOURCE OF DANGER ON A TRAVEL ROUTE

FIELD OF THE INVENTION

The present invention relates to a method and a device for ascertaining a source of danger on a travel route. In addition, the present invention relates to a computer program.

BACKGROUND INFORMATION

Digital maps are known on which navigation data and tips to so-called "points of interest" are stored, such gas stations, restaurants or amusement parks.

It would also be desirable to be able to show sources of danger of a travel route on such digital maps. To do this, however, such sources of danger would have to be ascertained first.

SUMMARY

An object on which the present invention is based may therefore be seen in providing a method for ascertaining a source of danger on a travel route.

The object on which the present invention is based may also be seen in providing a device for ascertaining a source of danger on a travel route.

The object on which the present invention is based may further be seen in providing a corresponding computer program.

According to one aspect, a method for ascertaining a source of danger on a travel route is provided. During travel of a vehicle along the travel route, a vehicle parameter is measured. The measured vehicle parameter is compared to a vehicle parameter threshold value. The danger data are formed as a function of the comparison. The danger data include the measured vehicle parameter and a vehicle location assigned to the measurement. That is, the danger data include, in particular, the information that, at the vehicle location assigned to the measurement, a danger source has been formed.

According to one further aspect, a device for ascertaining of a source of danger on a travel route is provided. The device includes a measuring apparatus for measuring a vehicle parameter. In addition, the device includes a location determination device for determining a vehicle location. Moreover, a data processing device is provided for comparing the measured vehicle parameter to a vehicle parameter threshold value and for forming danger data, the danger data including the measured vehicle parameter and a vehicle location assigned to the measurement. That is, the danger data include, in particular, the information that, at the vehicle location assigned to the measurement, a danger source has been formed.

According to a further aspect, a computer program is provided, which includes program code to execute the method for ascertaining a source of danger on a travel route, when the computer program is run on a computer.

According to still another aspect, a vehicle is provided which includes the device for ascertaining a source of danger on a travel route.

During travel of the vehicle along the travel route, because both a vehicle parameter and a vehicle location are recorded, advantageously a particularly simple ascertainment of a source of danger on the travel route is made possible, because the comparison of the measured vehicle parameter to the vehicle parameter threshold value is used to specify that, at the vehicle location assigned to the measurement, a danger source is formed. "Used", in this case, means that the comparison has to have a predetermined result in order to specify that, at the vehicle location assigned to the measurement, a source of danger is formed.

The comparison of the measured vehicle parameter and the vehicle parameter threshold value particularly includes a check as to whether the measured vehicle parameter is smaller than, greater than, equal to, smaller than, or equal to or greater than, or equal to the vehicle parameter threshold value. That is, this means in particular that the danger data are only formed if the measured vehicle parameter is less than, greater than, equal to, less than or equal to or greater than or equal to the vehicle parameter threshold value.

A danger source within the meaning of the present invention, in particular, prepares a danger for the vehicle. The word danger, in this instance, particularly designates circumstances and/or a situation in which a negative effect for the vehicle may occur. A negative effect may be an accident, for example, and/or vehicle damage and/or personal injury and/or uncontrollable or poorly controllable vehicle behavior.

Thus, a danger source may, for instance, be a particularly tight curve, in which the vehicle may begin to skid. One danger source may be roadway damage, for instance, such as lane ruts and/or potholes.

Because the danger data are only formed when the comparison has a certain result, noncritical vehicle maneuvers, such as parking and maneuvering processes are able to be detected. In this instance, the comparison acts advantageously as a plausibility check, in order to exclude these noncritical maneuvers from a further evaluation.

According to one specific embodiment, a plurality of vehicle parameters is measured. The vehicle parameters may particularly be the same or different, for example, in this connection. There then preferably takes place a comparison to a respective vehicle parameter threshold value. Corresponding danger data are then formed as a function of the comparisons.

A vehicle location assigned to the measurement, within the meaning of the present invention, means especially that a vehicle location is measured and assigned to the measured vehicle parameter. Thus, a linking or an assignment takes place, in this respect, between the measured vehicle parameter on the one hand, and the vehicle location on the other hand. In the simplest case, the information is formed, using the measurement of the vehicle location, that the vehicle is located along the travel route. This means then, in particular, that in this case the danger data include the information that a source of danger is formed along the travel route.

According to one specific embodiment, it may be provided that, at the time of the measurement of the vehicle parameter, the vehicle location is measured. Consequently, a particularly accurate assignment is made possible with respect to the location of the source of danger to the vehicle parameter. That is, the danger data then include particularly accurate information on where exactly the source of danger is formed along the travel route.

According to one specific embodiment, it may be provided that, at the time of the comparison, the vehicle location is measured. In particular, it may be provided that the vehicle location is measured as a function of the comparison. In particular, it may be provided that the vehicle location is measured when danger data are to be formed based on the comparison. Thus, especially in the latter case, a vehicle location is measured only when this is required. Consequently, calculating resources that are present are used particularly efficiently.

According to one specific embodiment, it may be provided that a vehicle location is continually measured.

According to one further specific embodiment, it may be provided that vehicle parameters be measured continually during travel of the vehicle along the travel route.

In another specific embodiment, it may be provided that the vehicle location be measured offset in time to the point in time of the measurement of the vehicle parameter or offset in time to the point in time of the comparison. In this connection, it particularly depends on the speed of the vehicle, as to how great a distance the vehicle has already by-passed between the measurement of the vehicle parameter and the measurement of the vehicle location. The shorter the time span between the measurement of the vehicle parameter or the comparison and the measurement of the vehicle location, the more accurate, as a rule, is the information on where exactly the source of danger is located along the travel route.

According to one specific embodiment, it may be provided that a vehicle location be measured using a navigation system.

In one specific embodiment, it may be provided that the vehicle parameter be a parameter selected from the following group of parameters: the operating state of a driver assistance system of the vehicle, a vehicle movement variable, a steering wheel angle speed or the sensor value of a sensor.

The vehicle movement variable is preferably a longitudinal acceleration, a transverse acceleration, a vertical acceleration, a yaw rate, a yawing acceleration or a vehicle speed. The sensor may be a collision sensor for detecting a collision, for example. The sensor may particularly be a sensor of an air bag sensor system.

The driver assistance system may be, for instance, an automatic cruise controller, an electronic stability program system, an antilock system (ABS), a drive slip control system (ASR), a lane keeping system, an emergency braking system or a lane departure warning system. If a plurality of vehicle parameters is measured, it may particularly be provided that vehicle parameters of different driver assistance systems be measured.

In the specific embodiment in which a plurality of vehicle parameters is measured, it may be provided that operating states of driver assistance systems and vehicle movement variables be measured, for example.

An operating state within the meaning of the present invention may be an active operating state, for example. An active operating state of a driver assistance system denotes particularly an operating state in which the driver assistance system automatically carries out an intervention in a vehicle guidance. This means, for example, in the case of an emergency braking system, that the vehicle automatically carries out an emergency braking. In the case of a lane keeping system, it may be provided, for example, that an active operating state is an operating state in which the system automatically holds the vehicle in a traffic lane. In the case of an automatic cruise controlling system, such an active operating state may be an operating state in which the system holds the vehicle automatically to a predetermined speed.

An operating state within the meaning of the present invention may particularly be a passive operating state, in which the driver assistance system does not carry out an intervention in a vehicle guidance.

This then means particularly that it is determined, based on the comparison, whether the driver assistance system is carrying out or has carried out an intervention in a vehicle guidance. If this is the case, corresponding danger data are preferably formed. Such danger data then include especially the information as to whether a driver assistance system of the vehicle has carried out an intervention in the vehicle guidance. The danger data include particularly the information as to which driver assistance system has carried out which intervention. Based on the measurement of the location of the vehicle, the information is then advantageously formed as to where, along the travel route, the driver assistance system has carried out the intervention.

According to one specific embodiment, it may be provided that an environmental parameter be selected from the following group of parameters: environmental temperature of the vehicle, clock time, weather, windshield wiper operating state, environmental brightness, environmental air pressure or environmental moisture.

The environmental parameter is preferably assigned to the danger data for information as to which environmental conditions were present at the time of the measurement of the vehicle parameter.

According to one specific embodiment, it may be provided that a plurality of environmental parameters is measured. The plurality of environmental parameters may, for instance, be formed to be equal or preferably different.

A windshield wiper operating state may be, for example, an active operating state, in which the windshield wiper is activated, and to this extent it frees a vehicle windshield of water, or rather moisture, that is, it wipes back and forth. The windshield wiper operating state may be, for instance, a passive operating state, in which the windshield wiper is not active, that is, it does not wipe back and forth. An active windshield wiper is particularly a hint that, at the time of the measurement of the vehicle parameter, rain or increased air moisture were present.

Thus, the environmental conditions prevailing at the time of the measurement of the vehicle parameters are recorded, in particular, by the measurement of environmental parameters. It is thus advantageously evaluated, in addition, whether special boundary conditions such as wintery road conditions were present.

Consequently, one may, for instance, obtain evidence as to whether the source of danger is a temporary source of danger or a durable one. For example, an intervention of a driver assistance system may have been necessary since there were slick or slippery road conditions. In response to dry conditions, however, such an intervention would not have been necessary. In this case, the source of danger is, in particular, only formed temporarily, as long as the weather conditions last. A particularly accurate ascertainment and determination and characterization are thus enabled in an advantageous manner According to one specific embodiment, it may be provided that the danger data be sent to a cloud server for further processing. A cloud server particularly denotes a server which is situated externally to the vehicle. A communication between the vehicle and the cloud server, for example, may be carried out using a wireless communications method, especially a mobile radio communications method.

A cloud server within the meaning of the present invention designates particularly a computer or a calculator or server or a computer composite or a calculator composite or a server composite, which is situated outside the vehicle or externally to the vehicle or, if a plurality of vehicles is provided, outside the plurality of vehicles or externally to the plurality of vehicles.

According to one specific embodiment, it may be provided that a plurality of vehicles travels along the travel route and correspondingly carry out the method steps for ascertaining a source of danger on a travel route. That is, in this specific embodiment, corresponding danger data are sent to the cloud server by a plurality of vehicles. The cloud server may also advantageously draw upon a multiplicity of danger data, in order to evaluate them, particularly to evaluate them statistically. The danger data of the plurality of vehicles are aggregated, in particular. Consequently, it may also preferably be checked statistically whether, at the measured vehicle locations that were assigned to the vehicle parameter, corresponding data sources have been formed, or whether, for example, faulty measurements are involved.

According to one specific embodiment, it may be provided that the danger data are sent to the cloud server after the end of the trip, that is, when the vehicle is particularly shut off and the driving engine/motor is deactivated.

Thus, the cloud server is advantageously able to evaluate the danger data received, as a central entity, and is correspondingly able to set a specific danger feature more closely characterizing the danger source at the corresponding vehicle locations, especially set it on a digital map, since, when using the danger data, it has the knowledge that at this place a danger source is formed. In particular, it sets this specific danger feature for a location along the travel route only if, at that location, a certain vehicle parameter has been included especially frequently by the danger data. In addition, the cloud server is also able to evaluate measured environmental parameters, in order, for example, to determine whether the danger source only appears in response to certain weather conditions.

That is, the cloud server evaluates the danger data, especially with respect to at which locations along the travel route which interventions on the part of which driver assistance systems have been carried out, and particularly how frequently. In particular, an evaluation of the danger data on the part of the cloud server takes place more or less depending on which vehicle parameters at which locations along the travel route are included by the danger data, especially how frequently a certain type of a vehicle parameter was measured at a certain location, the vehicle parameter leading to the danger data being formed.

The cloud server preferably first evaluates the danger data of the individual vehicles individually with respect to where which danger source is formed. Subsequently, only those locations are marked, that is, provided with a danger feature, at which, based on the individual evaluations a danger source is formed particularly frequently, that is, more frequently or more often than a predetermined frequency value.

According to one specific embodiment, it may be provided that, if the vehicle parameter is a vehicle transverse acceleration, a yaw rate or a yawing acceleration, a potential danger, provided using the danger source, is classified as a skidding danger. In particular, this then means that, if the vehicle transverse acceleration, the yaw rate or the yawing acceleration is greater than, or greater than or equal to a vehicle transverse acceleration threshold value, the potential danger is classified as a skidding danger.

In one specific embodiment it may be provided that, if the operating state of the driving dynamics control system is an active operating state, in which the driving dynamics control system carries out an intervention in a vehicle guidance, the potential danger provided using the danger source is classified as a skidding danger.

According to one specific embodiment, it may be provided that, if the vehicle parameter is an operating state of a lane keeping system, the danger source is classified as a curve. That is, this means, in particular, that if the operating state of the lane keeping system is an active operating state, in which the lane keeping system carries out an intervention in a vehicle guidance to the extent that the vehicle is held within a traffic lane, the danger data then particularly include the information that, at the measured vehicle location there is a curve present, especially a dangerous curve.

According to one specific embodiment, it may be provided that a curve radius is transmitted. Such a curve radius may particularly be ascertained from the steering wheel angle and/or a transverse acceleration $a_{transv}$ and a vehicle speed v according to the formula $r_{curve}=v^2/a_{transv}$. Especially when an operating state of a lane keeping system is measured as a vehicle parameter, in the case of forming the danger date it may be provided that the curve radius is ascertained and assigned to the danger data. It may preferably be provided that the parameters for ascertaining the curve radius are sent to the cloud server which, based on these parameters, ascertains the curve radius.

According to one specific embodiment, it may be provided that, if the vehicle parameter is a vehicle longitudinal acceleration, a potential danger, provided using the danger source, is classified as a potential rear-end collision.

According to one specific embodiment, it may be provided that, if the vehicle parameter is an operating state of an automatic emergency braking system, the potential danger, provided using the danger source, is classified as a potential rear-end collision.

According to one specific embodiment, it may be provided that, if the vehicle parameter is an operating state of an antilock system, a potential danger, provided using the danger source, is classified as a potential rear-end collision.

In the above specific embodiments, it is thus determined, in particular, whether the vehicle has been braked excessively forcefully. Thus, this means, in particular, that an increased danger for rear-end collisions exists, as a rule, at the corresponding vehicle location.

According to one specific embodiment, it may be provided that, if the vehicle parameter is a vertical acceleration, the danger source is classified as roadway damage, such as a pothole. This means, in particular, that it is determined that the vehicle has been accelerated in the vertical direction. This may happen based on a pothole, in particular.

According to one specific embodiment, it may be provided that a warning signal is provided based on the danger data. It may especially be provided that the cloud server provides, and sends to the vehicle such a warning signal. It may preferably be provided that such warning signals and especially the evaluated danger date are stored on a portable storage medium, so that by using the portable storage medium, the user is able to update a corresponding warning system or a navigation system in the vehicle.

The providing of the warning signal is particularly able to include indicating the danger source on a digital map.

The providing of the warning signal is particularly able to include indicating a danger symbol on a digital map. Such a danger symbol may particularly also be indicated on an instrument cluster. The danger location and the danger source may particularly be indicated on a digital map in a head unit.

The danger symbol and the data source may preferably be faded in on the digital map using a head-up display in the windshield of the vehicle.

It may preferably be provided that a maximum speed be displayed at which driving through a curve may be accomplished without danger, that is, without skidding.

Providing a warning signal may include, for example, acting upon the accelerator using a counterforce, so that the driver receives a haptic feedback, that is, a force feedback, via the accelerator, that he is driving towards a danger source.

According to one specific embodiment, it may be provided that, based on the danger data, a driver assistance system of the vehicle is being operated to carry out an action in reaction to the danger source.

This means, in particular, that the driver assistance systems, especially the driving stabilization systems are advantageously able to be prepared for the imminent danger, so that they are able to react rapidly and optimally to the danger.

It may be provided, for example, that a reparameterizing of the parameters of the driver assistance systems be carried out, based on which the driver assistance systems are being operated. It may be provided, for instance, that intervention thresholds be lowered, in order to enable an earlier intervention in a regulation.

For example, it may be provided that an actuator be prepared. In particular, it may be provided that a wheel brake cylinder be prefilled, in order to achieve advantageously a quicker effect of the intervention of the actuator.

It may be provided, for instance, that a target distance and a setpoint distance of an ACC system be increased, in order to gain a greater safety distance from the preceding vehicle. ACC stands for Adaptive Cruise Control, in this connection. Such an ACC system is also known by, and designated as the term Intelligent Cruise Control, particularly a speed regulating device which, during a regulation of a vehicle speed, additionally takes into account the distance from a preceding vehicle as an additional as an additional feedback controller output.

It may preferably be provided that a setting speed and a setpoint speed of a cruise control, especially of an intelligent cruise control be lowered.

A reparameterizing of adjustable shock absorbers may preferably be provided, in order to reduce the coupling of vertical disturbances, based on roadway damage, into a vehicle construction.

DETAILED DESCRIPTION

Figure 1:
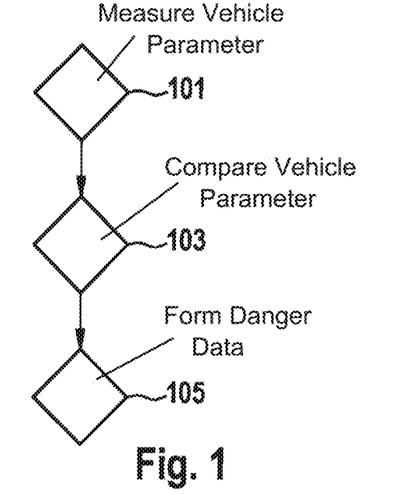
FIG. 1 a flow chart of a method for ascertaining a source of danger on a travel route.

FIG. 1 shows a flow chart of a method for determining a source of danger on a travel route.

According to a step 101, during travel of a vehicle along the travel route, a vehicle parameter is measured. According to a step 103, the measured vehicle parameter is compared to a vehicle parameter threshold value. According to a step 105, danger data are formed as a function of the comparison, which include the measured vehicle parameter and a vehicle location assigned to the measurement. That is, the danger data include, in particular, the information that, at the vehicle location assigned to the measurement, a danger source has been formed.

Figure 2:
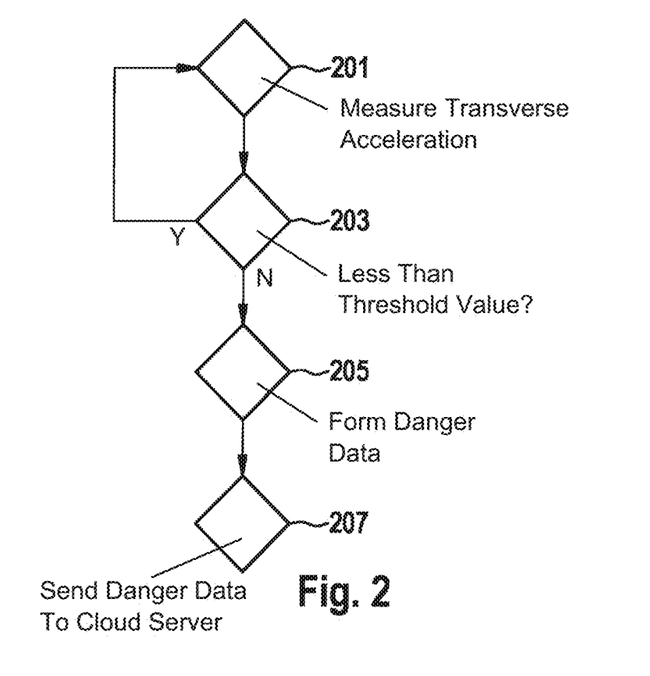
FIG. 2 a flow chart of a further method for ascertaining a source of danger on a travel route.

FIG. 2 shows a flow chart of an additional method for ascertaining a source of danger on a travel route.

According to a step 201, a transverse acceleration of the vehicle is measured during travel of the vehicle along the travel route.

In a step 203, it is checked whether the measured transverse acceleration is greater than, or equal to a transverse acceleration threshold value. If, according to step 203, it is determined that the measured transverse acceleration is less than the transverse acceleration threshold value, the method is ended and may be started anew in step 201, for example.

If, in step 203 it is determined that the measured transverse acceleration is greater than, or equal to the transverse acceleration threshold value, then in a step 205, danger data are formed including the measured transverse acceleration and a vehicle location assigned to the measurement for information that a danger source has been formed at the vehicle location assigned to the measurement.

Since the measured vehicle parameter is the transverse acceleration, the yaw rate or the yawing acceleration, a potential danger provided using the danger source may preferably be classified as a danger of skidding.

In a step 207, the danger data are sent to a cloud server. The cloud server is then able to evaluate the danger data appropriately, and, in particular, take over and pass through the above classification of the danger as a danger of skidding.

Figure 3:
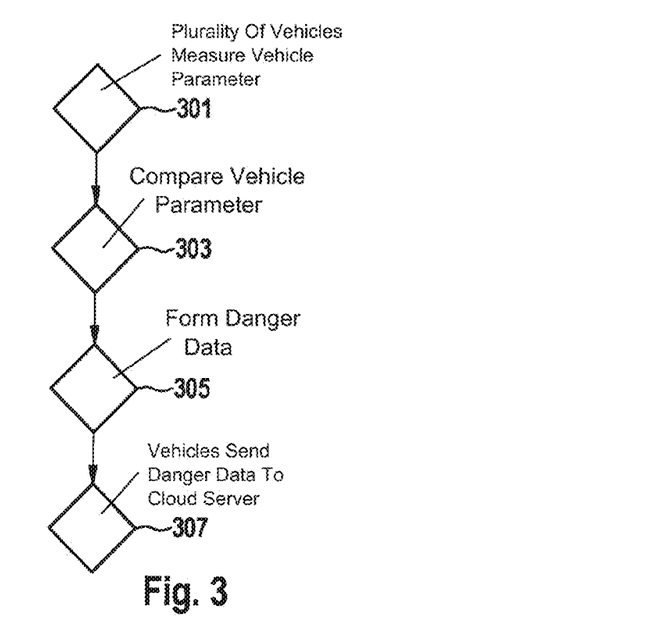
FIG. 3 a flow chart of another method for ascertaining a source of danger on a travel route.

FIG. 3 shows a flow chart of another method for ascertaining a source of danger on a travel route.

According to a step 301, a plurality of vehicles each measure a vehicle parameter, during their respective travel along the travel route. According to a step 303, a respective comparison takes place between the measured vehicle parameters and the respective vehicle parameter threshold values. As a function of the respective comparisons, in a step 305, danger data including the respective measured vehicle parameter and a respective vehicle location assigned to the measurement is formed for the information that a danger source has been formed at the vehicle location assigned to the respective measurement.

According to a step 307, the plurality of vehicles send their respective danger data to a cloud server. The cloud server is then advantageously able to evaluate the danger data received, especially statistically. An aggregation of the received danger data may preferably be carried out, in this instance. That is, in particular, one may advantageously gather evidence as to at which place along the travel route, which vehicle parameters have unusual measured values. This is advantageously able to provide evidence as to which specific danger and specific danger source is formed at that location.

This being the case, the cloud server as central entity is advantageously able to take into account, during the processing of the danger data, on the one hand, the type of the vehicle parameter, that is, the type of the measured value, and a state information of a driver assistance system, that is, in particular, an operating state. Consequently, the cloud server is able to form corresponding warning signals specifically on a certain type of danger, and particularly enter it into a digital map.

For if, for example, at a certain location, interventions of an electronic stability program vehicle regulating system pile up and/or of high values of a transverse acceleration and/or of high values of a yaw rate and/or of high values of a yawing acceleration pile up, then the warning signal includes the information that a danger of skidding exists at that certain location. High values mean, in this instance, particularly that the corresponding vehicle parameter is greater than, or greater than, or equal to a corresponding vehicle parameter threshold value.

At a location in a curve, if, for example, reports from lane keeping systems pile up, the warning signal includes the information that a dangerous curve exists at that location. It may advantageously be provided that one more curve radius be calculated and sent with the warning signal to the vehicles. Reports from lane keeping systems are particularly defined in that, in this case, an operating state of a lane keeping system has been measured, the measured operating state being an active operating state, in which the lane keeping system has carried out an intervention in a vehicle guidance.

If, for example, at a location along the travel route, automatic emergency brakings and/or ABS interventions and/or high values of a longitudinal acceleration pile up, a corresponding warning signal will include the information that an increased danger may exist of a rear-end collision at that location.

If, for instance, at one location, high values of a vertical acceleration pile up, a corresponding warning signal will include the information that roadway damage, for instance, one or more potholes, are present at that location.

Such warning signals may then be sent to the vehicles using the cloud server. Consequently, the vehicles are advantageously put into the position of being able to prepare their corresponding driving stabilization system, such as their ESP (Electronic Stability Program) systems or driver assistance systems quite generally for the potentially impending danger, in good time. Such a preparation may include a reparameterizing of the systems, for example. This means, for instance, that intervention thresholds are lowered, in order to enable an earlier intervention in a regulation.

In one specific embodiment that is not shown, it may be provided that, when a vehicle approaches a location along the travel route, at which a danger source has been ascertained, a warning signal is then provided. Thus, a vehicle rider and a vehicle driver are warned of the danger source rapidly and in time, and is correspondingly able to adjust his vehicle guidance and his driving behavior. It may preferably be provided that it be indicated on a digital map where there is a danger location and what type of danger is involved, in this instance.

In an additional specific embodiment that is not shown, it may be provided that corresponding danger features be formed for a digital map, based on an evaluation by the cloud server. Such danger features particularly include information as to at which location which danger source is located. Such danger features may then be particularly linked to navigation data and stored on a portable storage medium and then preferably marketed.

It may preferably be provided that a user download the danger features for his travel route via wireless data transmission from the cloud server or another central server. This advantageously makes possible taking into account short-term changes of danger situations, based, for example, on wintery road conditions.

Because the danger data are only formed when the comparison has a certain result, noncritical vehicle maneuvers, such as parking and maneuvering processes are able to be detected. This being the case, the latter items may be excluded by such plausibility checks. It is checked, for example, whether a vehicle speed is greater than, or equal to a vehicle speed threshold value. That is, a lower threshold is defined for the vehicle speed, above which danger data are then formed if the measured vehicle speed is greater than, or equal to this lower threshold. This particularly applies analogously for further vehicle parameters, especially the longitudinal acceleration, the transverse acceleration, the vertical acceleration (for instance, in vehicles having suspension control), the yaw rate, the yawing acceleration and the steering wheel angle speed.

Figure 4:
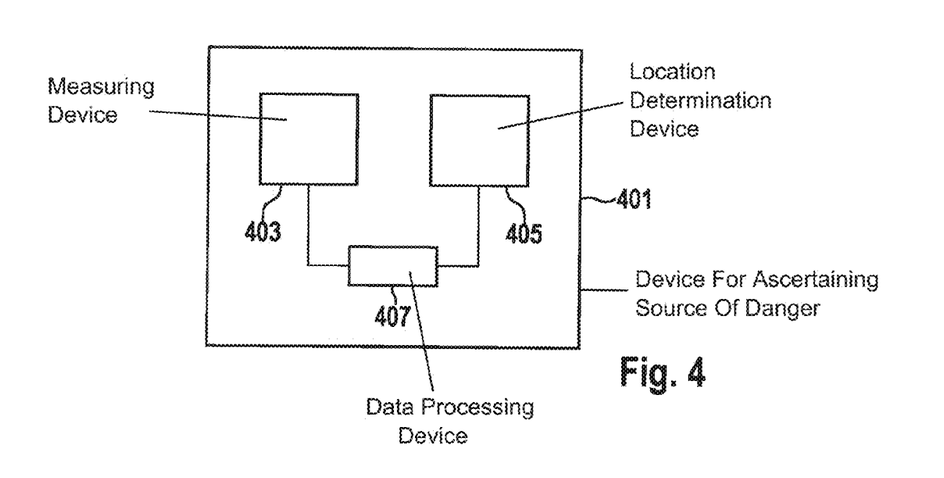
FIG. 4 a device for ascertaining a source of danger on a travel route.

FIG. 4 shows a device 401 for ascertaining a source of danger on a travel route.

Device 401 includes a measuring device 403 for measuring a vehicle parameter, a location determination device 405 for determining a vehicle location and a data processing device 407 for comparing the measured vehicle parameter to a vehicle parameter threshold value and for forming danger data including the measured vehicle parameter and a vehicle location assigned to the measurement for information that, at the vehicle location assigned to the measurement, a source of danger has been formed.

It may preferably be provided that location determination device 405 is formed as a navigation system or is included in such a system. Location determination device 405 may, for instance, include a GPS (Global Positioning System) sensor or several GPS sensors.

It may preferably be provided that measuring device 403 include one or a plurality of sensors for measuring the vehicle parameter. The sensors may, in particular, be formed to be equal or different. The sensor may, for instance, be an inertial sensor such as an acceleration sensor, a temperature sensor, a voltage sensor, a current sensor or a pressure sensor.

In summary, the present invention particularly includes the idea of ascertaining and recording especially curve radii and/or danger features automatically, based on reports of a vehicle or a plurality of vehicles. Such reports correspond, in this instance, in particular, to the transmitted vehicle data, which send information to the cloud server that, at a certain location along the travel route a driver assistance system or a driving stabilization system had to intervene in a vehicle guidance. In particular, the danger data include the information that an unusually high measuring value, that is, a measuring value greater than a predetermined threshold value of a vehicle movement variable has occurred. In this connection, in particular, the type of the event, that is, the specific vehicle parameter, the location at which the event occurred and/or a curve radius at that location, in case there is a curve there, are sent to the cloud server.

That is, in particular, a current vehicle position and a current vehicle location are networked together with state data of the driver assistance systems and/or the vehicle movement variables of the vehicle, and preferably sent to the cloud server for further evaluation.

What is claimed is:

1. A method for ascertaining a source of danger on a travel route, the method comprising:
   determining a vehicle location using a navigation system of a vehicle;
   measuring a vehicle parameter using a sensor on-board the vehicle;
   comparing, by a data processing device of the vehicle, the vehicle parameter to a vehicle parameter threshold value during a travel of the vehicle along a travel route;

as a function of the comparison, forming, by the data processing device, danger data including the vehicle parameter, the vehicle location, and a potential danger source at the vehicle location; and generating a warning signal based on the danger data.

2. The method as recited in claim 1, wherein the vehicle parameter is a parameter selected from the following group of parameters: an operating state of a driver assistance system of the vehicle, a vehicle movement variable, and a sensor value of the sensor.

3. The method as recited in claim 2, wherein the vehicle movement variable corresponds to one of a longitudinal acceleration, a transverse acceleration, a vertical acceleration, a yaw rate, a yawing acceleration, a steering wheel angle speed, and a vehicle speed.

4. The method as recited in claim 2, wherein the sensor includes a collision sensor for detecting a collision.

5. The method as recited in claim 1, further comprising measuring an environmental parameter and assigning the environmental parameter to the danger data, the environmental parameter corresponding to one of an environmental temperature of the vehicle, a time of day, a weather, a windshield wiper operating state, an environmental brightness, an environmental air pressure, and an environmental moisture.

6. The method as recited in claim 1, further comprising sending the danger data to a cloud server for further processing.

7. The method as recited in claim 1, further comprising classifying the potential danger source as a danger of skidding, if the vehicle parameter is at least one of a vehicle transverse acceleration, a yaw rate, a yawing acceleration and an operating state of a driving dynamics control system.

8. The method as recited in claim 1, further comprising classifying the potential danger source as a curve if the vehicle parameter is an operating state of a lane keeping system.

9. The method as recited in claim 1, further comprising classifying the potential danger source as a potential rear-end collision, if the vehicle parameter is one of a vehicle longitudinal acceleration and an operating state of one of an automatic emergency braking system and an antilock system.

10. The method as recited in claim 1, further comprising classifying the potential danger source as roadway damage if the vehicle parameter is a vertical acceleration.

11. The method as recited in claim 10, wherein the roadway damage corresponds to a pothole.

12. The method as recited in claim 1, wherein the warning signal is provided to a driver of the vehicle.

13. The method as recited in claim 1, further comprising, based on the danger data, operating a driver assistance system of the vehicle to carry out an action in reaction to the danger source.

14. A device for ascertaining a source of danger on a travel route, the device comprising:
an on-board sensor configured for measuring a vehicle parameter;
a location determination device for determining a vehicle location; and
a data processing device for:
comparing the vehicle parameter to a vehicle parameter threshold value during a travel of a vehicle along a travel route;
as a function of the comparison, forming danger data including the vehicle parameter, the vehicle location and a potential danger source at the vehicle location; and
providing a warning signal based on the danger data.

15. A non-transitory machine readable storage medium having a computer program, which when executed by a processor performs a method for ascertaining a source of danger on a travel route, the method comprising:
determining a vehicle location using a navigation system of a vehicle;
measuring a vehicle parameter using a sensor on-board the vehicle;
comparing, using a data processing device of the vehicle, the vehicle parameter to a vehicle parameter threshold value during a travel of the vehicle along a travel route;
as a function of the comparison, forming, using the data processing device, danger data including the vehicle parameter, the vehicle location, and a potential danger source at the vehicle location; and
generating a warning signal based on the danger data.

16. The non-transitory computer readable storage medium of claim 15, wherein the vehicle parameter includes at least one of: an operating state of a driver assistance system of the vehicle, a vehicle movement variable, or a sensor value of the sensor.

17. The non-transitory computer readable storage medium of claim 16, wherein the vehicle movement variable corresponds to at least one of: a longitudinal acceleration, a transverse acceleration, a yaw rate, a yawing acceleration, a steering wheel angle speed, or a vehicle speed.

18. The non-transitory computer readable storage medium of claim 16, wherein the vehicle movement variable corresponds to a vertical acceleration.

19. The non-transitory computer readable storage medium of claim 15, the method further comprising:
sending the danger data to a cloud server for evaluation; and
receiving evaluated danger data from the cloud server relating to the travel route, the evaluated danger data being based on an aggregate of danger data from a plurality of vehicles,
wherein the generating the warning signal is responsive to the evaluated danger data.

20. The non-transitory computer readable storage medium of claim 19, wherein the generating the warning signal is part of at least one of: displaying the evaluated danger data on a digital map, activating a driver assistance system of the vehicle, preparing an actuator of the vehicle, or changing a calculation parameter for a system of the vehicle.

21. The method as recited in claim 3, wherein the vehicle movement variable corresponds to a vertical acceleration.

22. The method as recited in claim 1, further comprising:
sending the danger data to a cloud server for evaluation; and
receiving evaluated danger data from the cloud server relating to the travel route, the evaluated danger data being based on an aggregate of danger data from a plurality of vehicles,
wherein the generating the warning signal is responsive to the evaluated danger data.

23. The method as recited in claim 22, wherein the generating the warning signal is part of at least one of: displaying the evaluated danger data on a digital map, activating a driver assistance system of the vehicle, preparing an actuator of the vehicle, or changing a calculation parameter for a system of the vehicle.

24. The device of claim 14, wherein the vehicle parameter includes at least one of: an operating state of a driver assistance system of the vehicle, a vehicle movement variable, or a sensor value of the sensor.

25. The device of claim 24, wherein the vehicle movement variable corresponds to at least one of: a longitudinal acceleration, a transverse acceleration, a yaw rate, a yawing acceleration, a steering wheel angle speed, or a vehicle speed.

26. The device of claim 24, wherein the vehicle movement variable corresponds to a vertical acceleration.

27. The device of claim 14, further comprising:
a mobile radio configured for:
sending the danger data to a cloud server for evaluation; and
receiving evaluated danger data from the cloud server relating to the travel route, the evaluated danger data being based on an aggregate of danger data from a plurality of vehicles,
wherein the providing the warning signal is responsive to the evaluated danger data.

28. The device of claim 27, wherein the generating the warning signal is part of at least one of: displaying the processed danger data on a digital map, activating a driver assistance system of the vehicle, preparing an actuator of the vehicle, or changing a calculation parameter for a system of the vehicle.

* * * * *